(12) United States Patent
Mitaru

(10) Patent No.: US 7,809,778 B2
(45) Date of Patent: Oct. 5, 2010

(54) IDEMPOTENT JOURNAL MECHANISM FOR FILE SYSTEM

(75) Inventor: Alexandru Mitaru, Beaverton, OR (US)

(73) Assignee: Omneon Video Networks, Sunnyvale, CA (US)

( * ) Notice: Subject to any disclaimer, the term of this patent is extended or adjusted under 35 U.S.C. 154(b) by 224 days.

(21) Appl. No.: 11/371,694

(22) Filed: Mar. 8, 2006

(65) Prior Publication Data
US 2007/0214195 A1 Sep. 13, 2007

(51) Int. Cl.
G06F 7/00 (2006.01)
G06F 17/30 (2006.01)
(52) U.S. Cl. ............... 707/826; 707/672; 707/640
(58) Field of Classification Search ........... 707/204, 707/200, 640, 641, 661, 672, 821, 822, 826
See application file for complete search history.

(56) References Cited

U.S. PATENT DOCUMENTS

| | | | | |
|---|---|---|---|---|
| 5,499,367 A * | 3/1996 | Bamford et al. | ............. | 707/8 |
| 5,590,318 A * | 12/1996 | Zbikowski et al. | ........... | 707/202 |
| 5,740,432 A * | 4/1998 | Mastors | ............. | 707/202 |
| 5,907,848 A * | 5/1999 | Zaiken et al. | ............. | 707/202 |
| 5,933,838 A * | 8/1999 | Lomet | ............. | 707/202 |
| 6,067,541 A * | 5/2000 | Raju et al. | ............. | 707/3 |
| 6,092,087 A * | 7/2000 | Mastors | ............. | 707/202 |
| 6,618,822 B1 * | 9/2003 | Loaiza et al. | ............. | 714/20 |
| 6,665,675 B1 | 12/2003 | Mitaru | | |
| 6,874,001 B2 * | 3/2005 | Narang et al. | ............. | 707/203 |
| 6,977,908 B2 | 12/2005 | de Azevedo et al. | | |
| 6,978,398 B2 | 12/2005 | Harper et al. | | |
| 7,076,508 B2 * | 7/2006 | Bourbonnais et al. | ....... | 707/202 |
| 7,257,595 B2 * | 8/2007 | Verma et al. | ............. | 707/101 |
| 2003/0187859 A1 | 10/2003 | Belov | | |
| 2003/0187860 A1 | 10/2003 | Holland | | |
| 2003/0187866 A1 | 10/2003 | Zelenka | | |
| 2003/0187883 A1 | 10/2003 | Zelenka et al. | | |
| 2004/0078633 A1 | 4/2004 | Holland | | |
| 2004/0153479 A1 | 8/2004 | Mikesell et al. | | |
| 2005/0165865 A1 * | 7/2005 | Farmer | ............. | 707/203 |
| 2006/0106891 A1 * | 5/2006 | Mahar et al. | ............. | 707/203 |
| 2006/0149792 A1 * | 7/2006 | Yamagami | ............. | 707/202 |
| 2006/0253502 A1 * | 11/2006 | Raman et al. | ............. | 707/202 |

FOREIGN PATENT DOCUMENTS

WO 9514273 A1 5/1995

OTHER PUBLICATIONS

C. Akinlar, et al., *A Scalable Bandwidth Guaranteed Distributed Continuous Media File System Using Network Attached Autonomous Disks*, IEEE Transactions on Multimedia, vol. 5, No. 1, Mar. 2003, ISSN: 1520-9210 (pp. 71-96).

(Continued)

*Primary Examiner*—James Trujillo
*Assistant Examiner*—Jeffrey Burke
(74) *Attorney, Agent, or Firm*—Hickman Palermo Truong & Becker LLP

(57) ABSTRACT

Use and maintenance of an idempotent journal in a system having multiple metadata servers. A data modification operation is performed by a metadata server. A journal entry corresponding to the data modification operation is generated. The journal entry includes a file identifier and a journal sequence number corresponding to a data modification operation that created the file.

12 Claims, 5 Drawing Sheets

OTHER PUBLICATIONS

Srinivas Eeda, *Oracle Cluster File System Physical Design & Implementation*, Oracle Corporation, California, USA, Dec. 2003 (65 pages).

Preslan, et al., *A 64-Bit, Shared disk File System for Linux*, Sixteenth IEEE Mass Storage Systems Symposium, Mar. 15-18, 1999 (pp. 22-41).

Anderson, et al., *xFS Project Architecture*, Silicon Graphics, Oct. 8, 1993 (pp. 1-15).

Shepard, et al., *SGI InfiniteStorage Shared Filesystem CXFS: A High Performance, Multi-OS Filesystem from SGI*, White Paper, Jun. 16, 2004 (19 pages).

*Implementing Total Data Life Management With StorNext Management Suite*, Advanced Digital Information Center, Washington, USA, ADIC White Paper 2004 (22 pages).

Ghemawat, et al., *The Google File System*, 19th ACM Symposium on Operating Systems Principles, New York, USA, Oct. 2003 (15 pages).

Haskin et al., "Recovery Management in QuickSilver," ACM Transactions on Computer Systems, vol. 6, No. 1, Feb. 1988, published by Association for Computing Machinery, pp. 82-108.

* cited by examiner

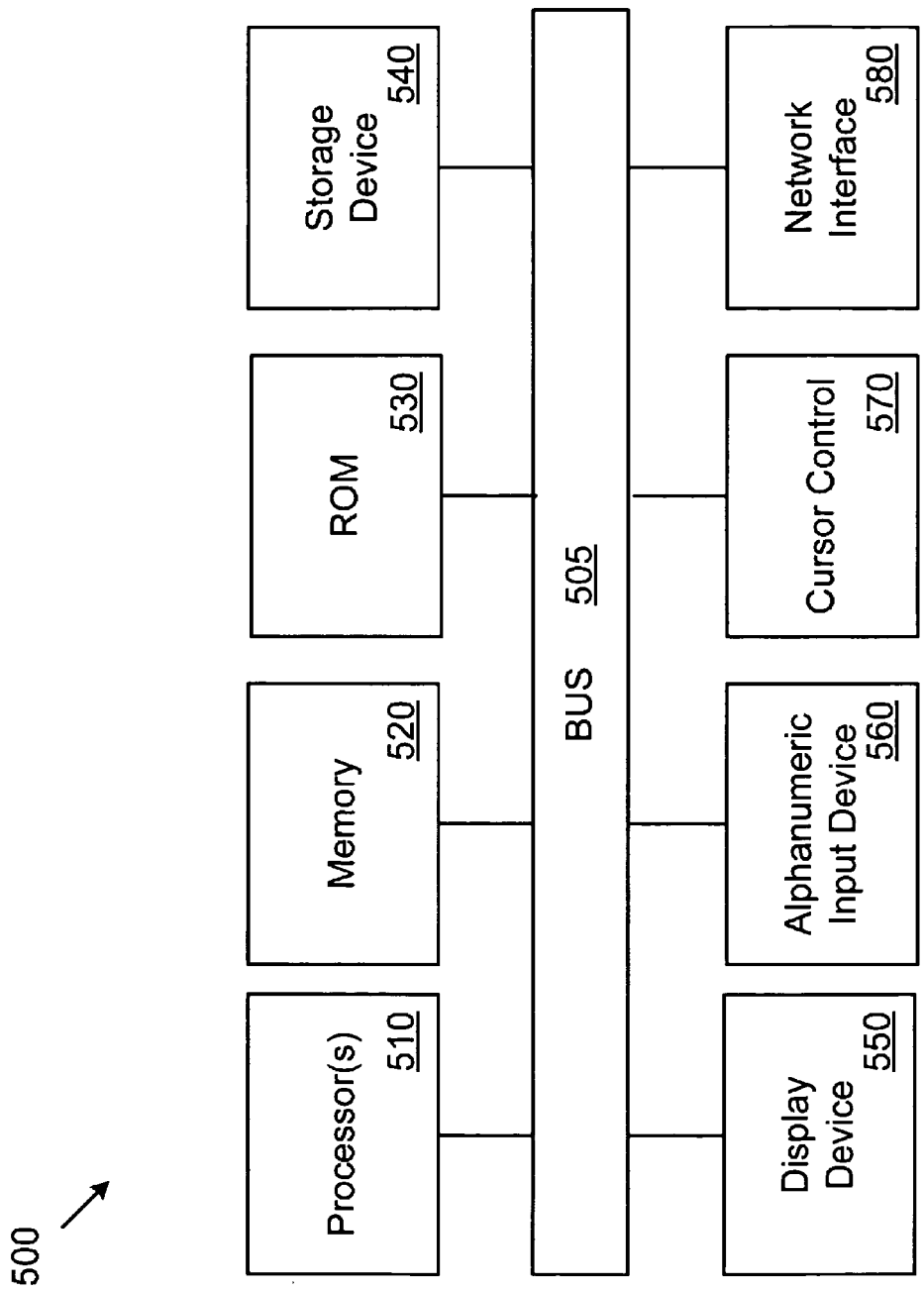

IDEMPOTENT JOURNAL MECHANISM FOR FILE SYSTEM

TECHNICAL FIELD

Embodiments of the invention relate to file system management. More particularly, embodiments of the invention relate to techniques for use of a file management system having distributed metadata servers that may be used, for example, in a system that may support video editing, video archiving and/or video distribution.

BACKGROUND

In general, a file system is a program (or set of programs) that provides a set of functions related to the storage and retrieval of data. The data may be stored, for example, on a non-volatile storage device (e.g., hard disk) or volatile storage device (e.g., random access memory). Typically, there is a set of data (e.g., file name, access permissions) associated with a file that is referred to as "file metadata." The file metadata can be accessed during the process of accessing a file.

BRIEF DESCRIPTION OF THE DRAWINGS

The invention is illustrated by way of example, and not by way of limitation, in the figures of the accompanying drawings in which like reference numerals refer to similar elements.

FIG. 5 is a block diagram of one embodiment of an electronic system.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Journal Entries

In general, a journal includes a listing of operations performed by a metadata server. The journal allows other metadata servers (or other system devices) to repeat the operations performed by the metadata server. Thus, the journal may be used to synchronize data modification operations and support a coherent data system.

In one embodiment, the journals described above may be utilized to provide an idempotent journal mechanism for the file system. In general, "idempotent" means that repeated applications of one or more operations have the same result as a single application of the one or more operations. Thus, in the system described herein, multiple applications of the operations in the journals may have the same effect as a single application of the operations in the journals. One advantage is that the state of the file system may not be exactly defined prior to application of the operations in the journals. This may allow the operations to be applied without corrupting the metadata.

As described in greater detail below, the following mechanism may be utilized to provide an idempotent journaling. In one embodiment, each entry in the journals includes a sequence number. The sequence number should be unique and sequence numbers should be monotonically increasing. In one embodiment, each file system object (e.g., file, file slice, data segment) may include the journal sequence number (JSN) for the journal entry corresponding to the operation that created the file system object. The JSN becomes part of the file metadata. In one embodiment, within the journal a file system object may be referenced by its name and the JSN of the journal the created the file. The combination of the file name and JSN will provide an absolutely unique reference within the file system.

In one embodiment, the JSN must be unique within the file system for the life of the file system; it can be therefore implemented as a number with a very large dynamic range (i.e. 64 bits). Even when journal entries are generated at a rate of 10,000 entries per second, a 64-bit JSN would allow 4 million years before it wraps.

In one embodiment, each time a journal is executed the file name and JSN doublet are compared to the file name and JSN of the target file. If the JSNs do not match the reference is considered invalid and the operation is ignored.

Figure 1:
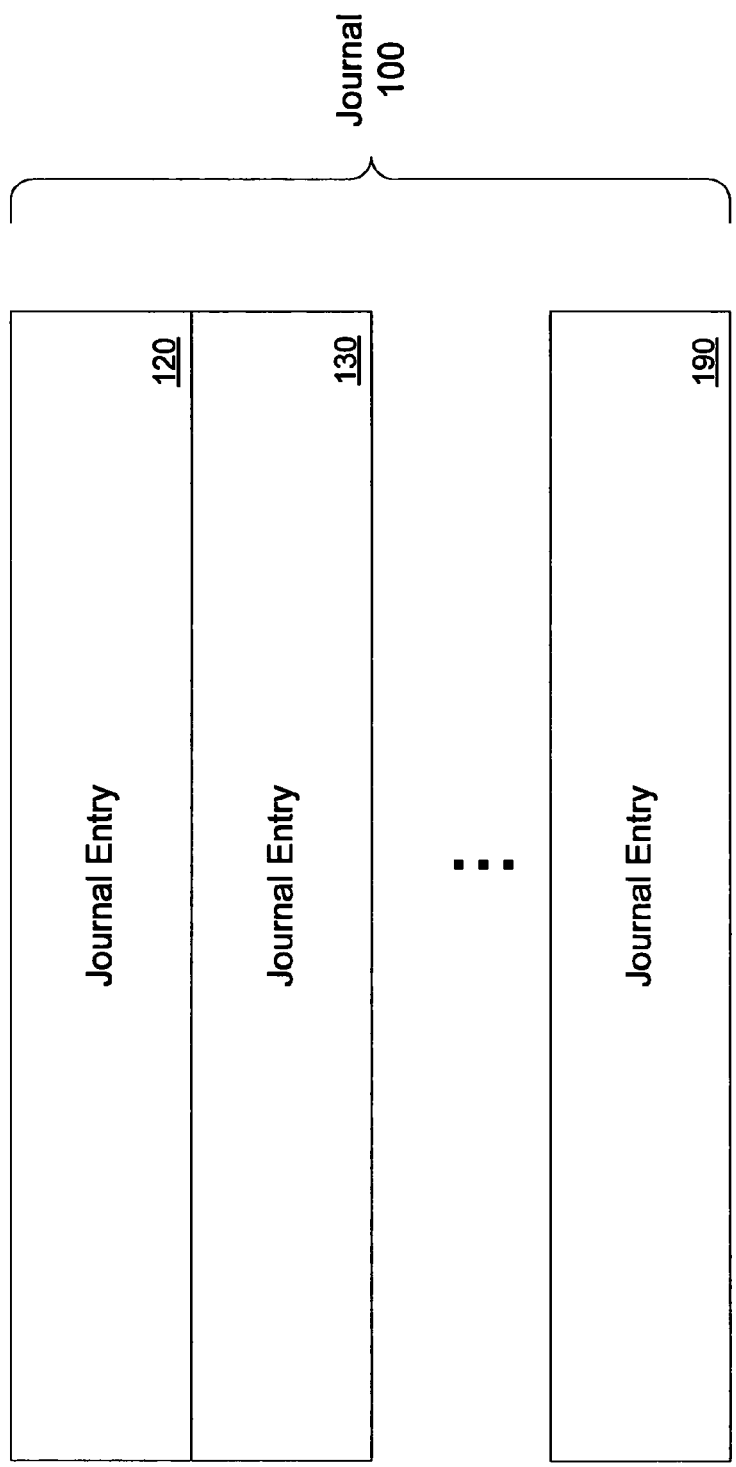
FIG. 1 is a conceptual illustration of a journal.
Figure 2:
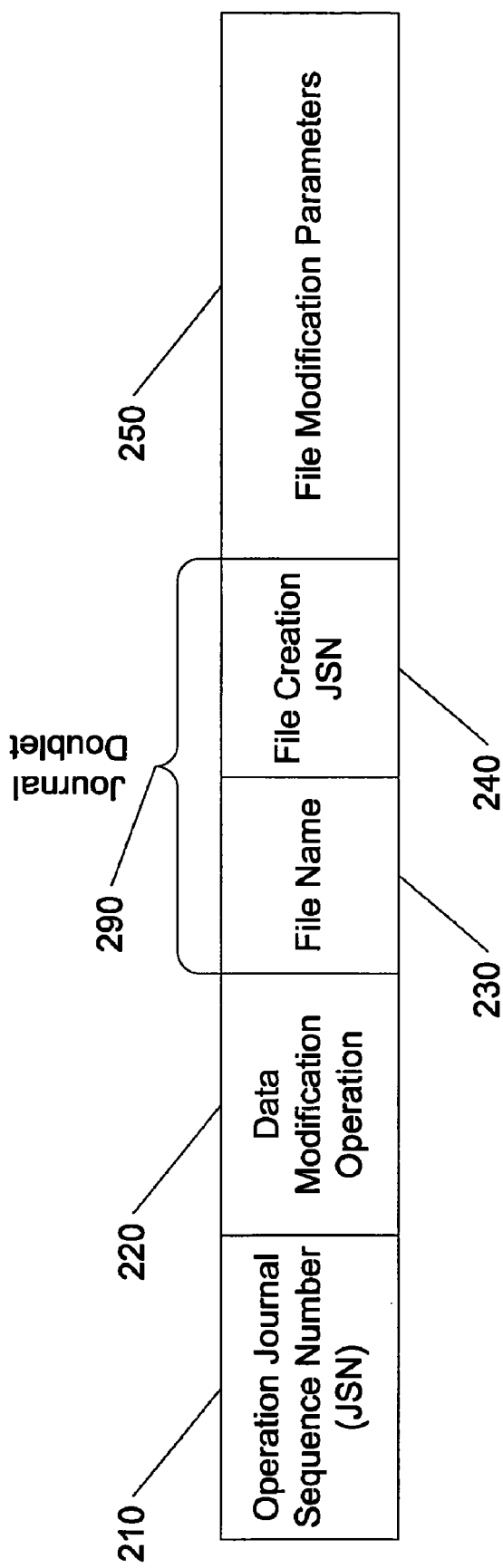
FIG. 2 is a conceptual illustration of one embodiment of a journal entry.

FIG. 2 is a conceptual illustration of one embodiment of a journal entry. In one embodiment, for each operation recorded an entry such as the entry illustrated in FIG. 2 may be generated and maintained as part of the journal. In one embodiment, each entry 200 may include the fields illustrated in FIG. 2 as well as additional fields. In alternate embodiments, different fields may be used.

In one embodiment, when a data modification operation is performed a journal entry 200 is generated. Entry 200 will include journal sequence number (JSN) field 210 to store a JSN corresponding to entry 200. As described above, the JSN will be a unique large (e.g., 64-bit) number that is selected from a predetermined pattern (e.g., monotonically increasing). As another example described in greater detail below, the JSN may be used as a technique to provide an idempotent journal mechanism.

Entry 200 may further include data modification operation field 220 to store a data modification operation corresponding to entry 200. The data modification operation may be any type of data modification operation, for example, a file creation operation, a data write operation. Entry 200 may also include parameters 250 that correspond to the data modification operation stored in data modification filed 220. The parameters stored in parameter field 250 may be any type of parameters relevant to the data modification operation stored in data modification field 220. The parameters may vary based on the type of operation stored in the entry.

In one embodiment, each entry includes journal doublet 290, which includes file name field 230 and file creation JSN field 240. File name field 230 may store a file name or other file identifier. File creation JSN field 240 may store a JSN corresponding to the data modification operation that created the file identified by the file name. In one embodiment, journal doublet 290 may be used to identify a file to which a data modification operation may be applied.

Because a file name is generally not required to be unique through all time it is possible that a file may be created, deleted and another file created with the same name in a short period of time. If so, and a data modification operation targeting the first file is performed in the second file the file system will be corrupted. However, by using journal doublet 290, an idempotent journal mechanism may be provided.

Figure 3:
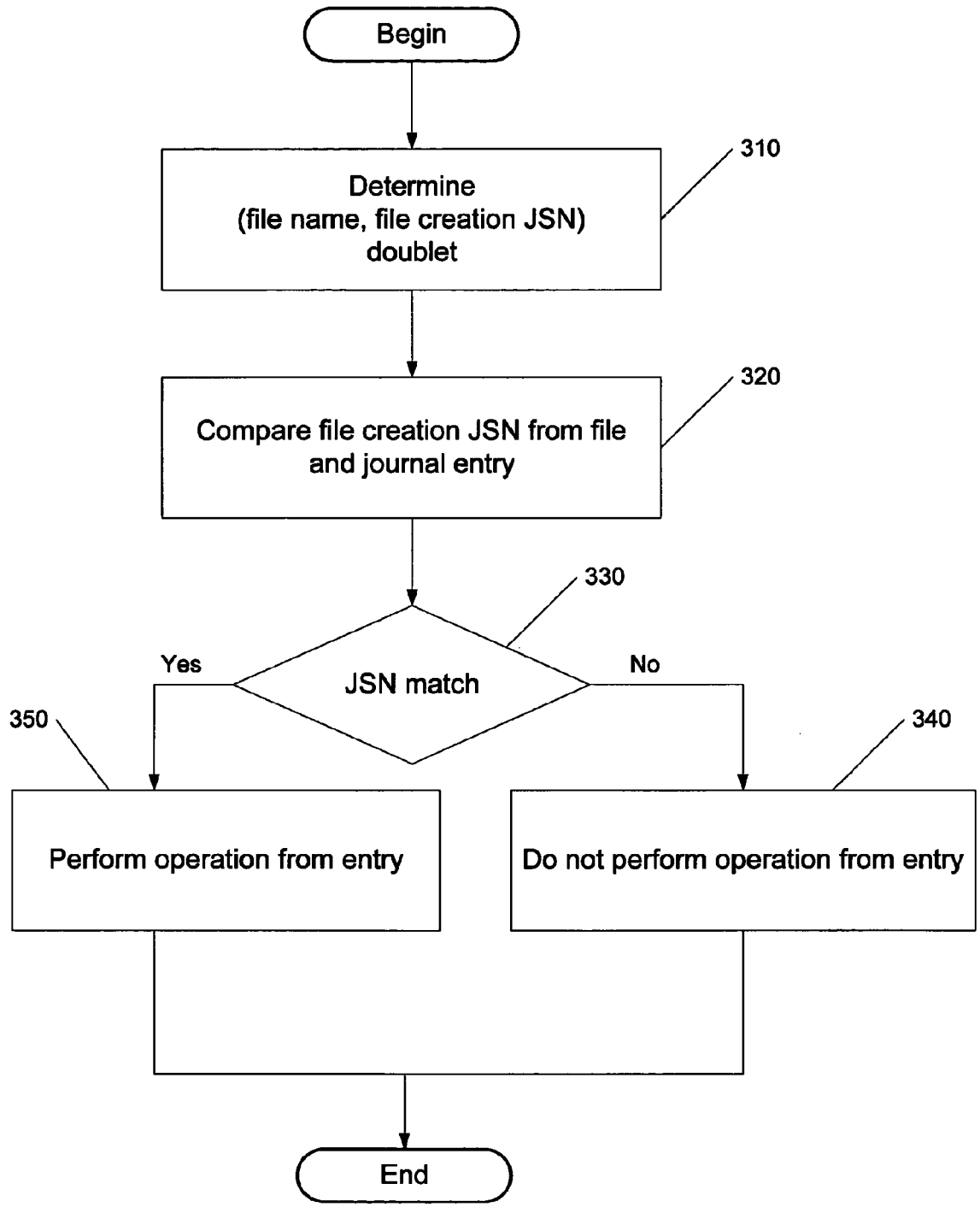
FIG. 3 is a flow diagram of one embodiment of a technique for performing data modification operations using journal entries.

FIG. 3 is a flow diagram of one embodiment of a technique for performing data modification operations using journal entries. A metadata server may perform a data modification operation that is stored in an entry of a journal for synchronization purposes or for file system restoration purposes. Before performing the data modification operation, the metadata server may determine the journal doublet (described with respect to FIG. 2) including the file name and the file creation JSN from the entry, 310.

The journal doublet may be compared with the file creation JSN of the file having a name matching the journal doublet, 320. If the file names and the file creation JSN match, 330, the data modification operation from the entry can be performed, 350. If the file names and file creation JSN do not match, 330, the data modification operation from the entry is ignored, 340.

System Overview

Figure 4:
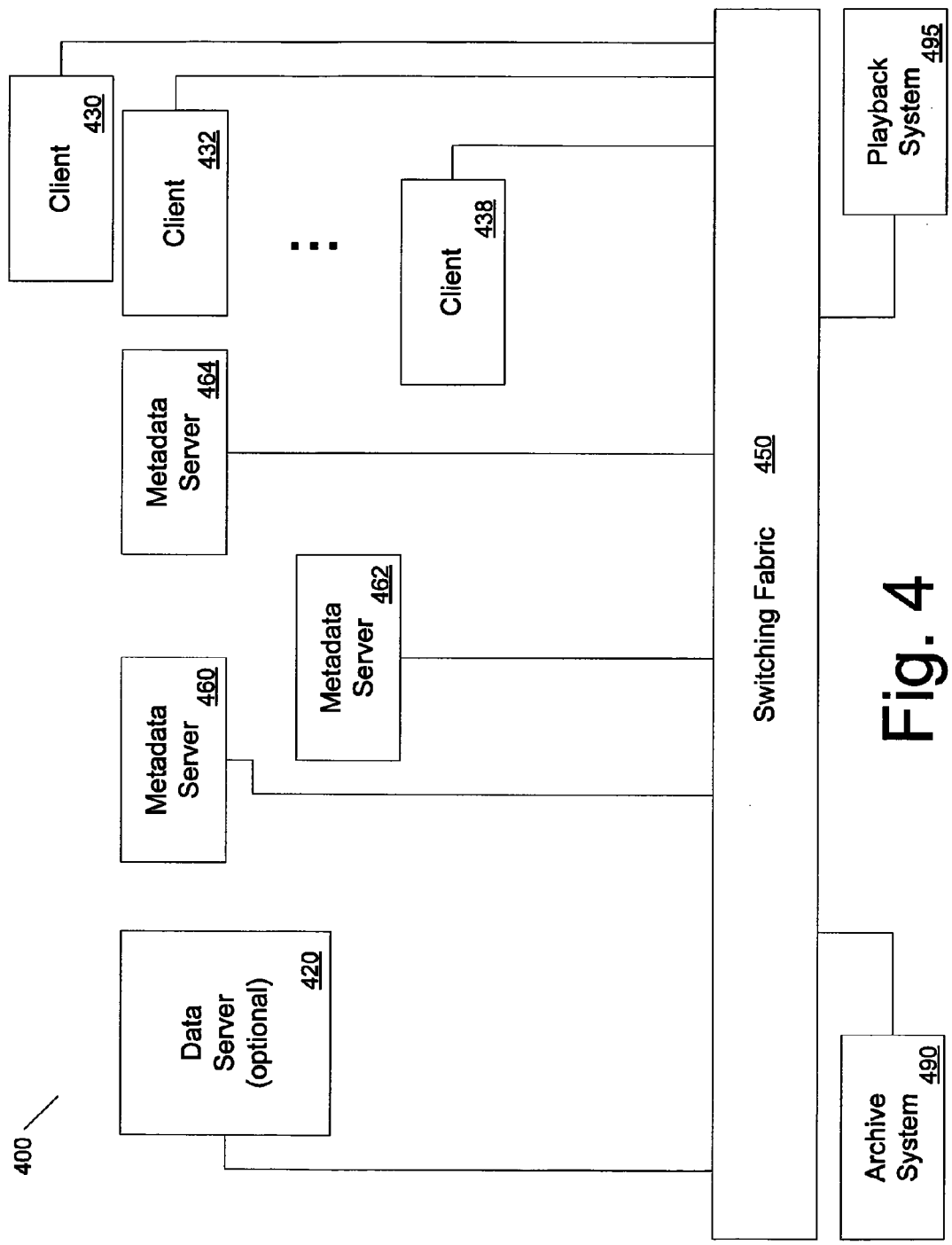
FIG. 4 is a block diagram of one embodiment of a system that may utilize a file system with distributed metadata servers.

FIG. 4 is a block diagram of one embodiment of a system that may utilize a file system with distributed metadata servers. In one embodiment, the various components of the system of FIG. 4 are interconnected using standard interconnection technologies (e.g., Ethernet, Gigabit Ethernet). For example, in one embodiment, switching fabric 450 may be a Gigabit Ethernet (or 10 Gigabit Ethernet) interconnection architecture to allow the various components of system 400 to communicate with each other.

In one embodiment, multiple client devices (e.g., 430, 432, . . . 438) may be interconnected via switching fabric 450. Client devices may allow users to access and/or otherwise utilize data available through system 400. In one embodiment, the client devices are computer systems having sufficient storage and input/output capability to allow users to manipulate data stored in various servers. For example, in a multimedia system, the client devices may allow users to access stored multimedia files as well as edit or otherwise utilize the multimedia files.

In one embodiment, the system of FIG. 4 may include any number of metadata servers, each of which may store metadata for files that are stored in the system. In one embodiment, a metadata server may be responsible for managing the file system and may be the primary point of contact for client devices. In one embodiment, each client device may include file system driver (FSD) software that may present a standard file system interface, for accessing files in the system.

In one embodiment, the various electronic systems of FIG. 4 (e.g., data servers, metadata servers, clients) as an electronic system such as, for example, the electronic system of FIG. 5. The electronic system illustrated in FIG. 5 is intended to represent a range of electronic systems, for example, computer systems, network access devices, etc. Alternative systems, whether electronic or non-electronic, can include more, few and/or different components.

Electronic system 500 includes bus 501 or other communication device to communicate information, and processor 502 coupled to bus 501 to process information. While electronic system 500 is illustrated with a single processor, electronic system 500 can include multiple processors and/or co-processors. Electronic system 500 further includes random access memory (RAM) or other dynamic storage device 504 (referred to as memory), coupled to bus 501 to store information and instructions to be executed by processor 502. Memory 504 also can be used to store temporary variables or other intermediate information during execution of instructions by processor 502.

Electronic system 500 also includes read only memory (ROM) and/or other static storage device 506 coupled to bus 501 to store static information and instructions for processor 502. Data storage device 507 is coupled to bus 501 to store information and instructions. Data storage device 507 such as a magnetic disk or optical disc and corresponding drive can be coupled to electronic system 500.

Electronic system 500 can also be coupled via bus 501 to display device 521, such as a cathode ray tube (CRT) or liquid crystal display (LCD), to display information to a user. Alphanumeric input device 522, including alphanumeric and other keys, is typically coupled to bus 501 to communicate information and command selections to processor 502. Another type of user input device is cursor control 523, such as a mouse, a trackball, or cursor direction keys to communicate direction information and command selections to processor 502 and to control cursor movement on display 521. Electronic system 500 further includes network interface 530 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 530) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

CONCLUSION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:

performing a first data modification operation that creates a file;

at a first metadata server, performing a second data modification operation on the file;

generating a journal entry corresponding to the second data modification operation, wherein the journal entry includes a file identifier of the file and a journal sequence number that uniquely identifies another journal entry that corresponds to the first data modification operation that created the file, and a journal sequence number corresponding to the journal entry, and an indication of the second data modification operation;

at a second metadata server, in response to determining that (a) a name of a target file matches the file identifier and (b) a second journal sequence number stored in metadata associated with the target file matches the journal sequence number that corresponds to the first data modification operation, performing a third data modification operation identified in the journal entry on the target file.

2. The method of claim 1 wherein the file identifier comprises a file name.

3. The method of claim 1 further comprising generating a journal sequence number for the second data modification operation on the file via the metadata server.

4. The method of claim 1 wherein the journal entry comprises a file indicator corresponding to the file to be modified by the second data modification operation, and one or more parameters corresponding to the second data modification operation on the file.

5. The method of claim 1 further comprising transmitting the journal entry to one or more remote metadata servers.

6. An article comprising a computer-readable medium having stored thereon instructions that, when executed, cause one or more processors to:

perform a first data modification operation on a file;

perform a second data modification operation on the file via a metadata server; and generate a journal entry corresponding to the second data modification operation, wherein the journal entry includes a file identifier of the file and a journal sequence number that uniquely identifies another journal entry that corresponds to the first data modification operation that created the file, and a journal sequence number corresponding to the journal entry, and an indication of the second data modification operation;

performing a third data modification operation on a target file in response to determining that (a) a name of the target file matches the file identifier and (b) a second journal sequence number stored in metadata associated with the target file matches the journal sequence number that corresponds to the first data modification operation.

7. The article of claim 6 wherein the file identifier comprises a file name.

8. The article of claim 6 further comprising instructions that, when executed, cause the one or more processors to generate a journal sequence number for the second data modification operation on the file via the metadata server.

9. The article of claim 6 wherein the journal entry comprises a file indicator corresponding to the file to be modified by the second data modification operation, and one or more parameters corresponding to the second data modification operation on the file.

10. The article of claim 6 further comprising instructions that, when executed, cause the one or more processors to transmit the journal entry to one or more remote metadata servers.

11. A system comprising:

a plurality of metadata servers, wherein each metadata server in the plurality of metadata servers generates a journal corresponding to data modification operations and transmits the journal to at least one other metadata server;

a plurality of data servers coupled with the plurality of metadata servers, the data servers to store data arranged as files;

wherein a file on a selected data server is created by a first data modification operation;

at least one client device coupled with the metadata servers to initiate a second data modification operation on the file stored on the selected data server;

wherein, in response to a metadata server in the plurality of metadata servers performing the second data modification operation, a journal entry is generated that includes an indication of the data modification operation, a file identifier corresponding to the file and a journal sequence number that uniquely identifies another journal entry that corresponds to the first data modification operation that resulted in creation of the file, and a journal sequence number corresponding to the journal entry, and an indication of the second data modification operation;

wherein, in response to determining that (a) a name of a target file matches the file identifier and (b) a second journal sequence number stored in metadata associated with the target file matches the journal sequence number that corresponds to the first data modification operation, performing a third data modification operation identified in the journal entry on the target file.

12. The system of claim 11 wherein the journal entry includes a journal sequence number corresponding to the second data modification operation indicated in the journal entry.

\* \* \* \* \*